United States Patent [19]

Boeke et al.

[11] Patent Number: 4,631,324
[45] Date of Patent: Dec. 23, 1986

[54] PROCESS FOR THE PRODUCTION OF PASTE-FORMING POLYMERS OF VINYL CHLORIDE

[75] Inventors: Burkhard Boeke, Haltern; Josef Kalka, Herten, both of Fed. Rep. of Germany

[73] Assignee: Huels Aktiengesellschaft, Marl, Fed. Rep. of Germany

[21] Appl. No.: 689,517

[22] Filed: Jan. 9, 1985

[30] Foreign Application Priority Data

Mar. 25, 1982 [DE] Fed. Rep. of Germany ....... 3210891

[51] Int. Cl.$^4$ .............................................. C08F 2/24
[52] U.S. Cl. .................... 526/212; 526/214; 526/225
[58] Field of Search ................ 526/211, 212, 214, 225

[56] References Cited

U.S. PATENT DOCUMENTS

| 4,093,581 | 6/1978 | Anderson | 526/212 |
| 4,273,904 | 6/1981 | Bush | 526/91 |
| 4,292,420 | 9/1981 | Turner | 526/212 |
| 4,292,424 | 9/1981 | Huddleston, Jr. | 526/500 |
| 4,310,649 | 1/1982 | Sjolin | 526/212 |
| 4,340,702 | 7/1982 | Huddleston, Jr. | 526/212 |
| 4,371,677 | 2/1983 | Morningstar | 526/212 |

FOREIGN PATENT DOCUMENTS

| 2260957 | 6/1973 | Fed. Rep. of Germany . |
| 2742178 | 5/1978 | Fed. Rep. of Germany . |
| 2850105 | 5/1980 | Fed. Rep. of Germany . |
| 2629655 | 9/1980 | Fed. Rep. of Germany . |
| 1383100 | 12/1972 | United Kingdom | 526/212 |

*Primary Examiner*—Christopher Henderson
*Attorney, Agent, or Firm*—Millen & White

[57] ABSTRACT

Paste-forming polymers of vinyl chloride are produced by discontinuous emulsion polymerization, adding to the polymerization charge, in a batchwise or continuous fashion, an emulsifier system comprising
(a) alkyl sulfonates, alkylaryl sulfonates, or sulfosuccinates in amounts of 0.2–3% by weight, based on the amount of monomer, and
(b) 50–200% by weight, based on the amount of surface active agent employed, of a $C_{14}$-$C_{20}$-alkyl alcohol.

the PVC powders obtained yield pastes exhibiting low viscosities in both the low and high shear ranges.

17 Claims, No Drawings

PROCESS FOR THE PRODUCTION OF PASTE-FORMING POLYMERS OF VINYL CHLORIDE

This application is a continuation of Ser. No. 478,766, filed Mar. 25, 1983, now abandoned.

BACKGROUND OF THE INVENTION

The present invention relates to a process for the production of vinyl chloride polymers by discontinuous emulsion polymerization in the presence of water-soluble catalysts and emulsifiers, as well as polymerization adjuvants.

It has been known to manufacture polyvinyl chloride suitable for paste preparation by continuous or discontinuous processes.

The continuous process produces a PVC paste having a desirably low viscosity in the high shear range, but with a high viscosity at low shear rates. In addition, such polyvinyl chlorides contain a relatively high proportion of emulsifiers. A high emulsifier concentration has an adverse effect on the final products and during processing. For example, it will impair transparency and increase the water sensitivity of the polymers and of the articles produced therefrom.

In the discontinuous process, two versions are known in principle. According to the so-called microsuspension process, latices are obtained having a relatively low solids content of about 40% by weight. Spray-drying of these latices thus results in increased drying costs. In addition, considerable expenditures are connected with the conductance of the process since it requires an additional step preceding the polymerization, namely a preliminary homogenizing of water, vinyl chloride, emulsifiers, as well as monomer-soluble catalysts using homogenizers. The spray-dryed products result in pastes having pronounced dilatant flow behavior. Accordingly, they have little suitability for use in spread-coating methods.

French Pat. No. 2,086,635 discloses a two-stage miscrosuspension process describing the production of PVC latices having high solids concentrations. However, in addition to the additional preliminary homogenization, the method demands the preparation of a seed latex and thus entails further excessive expenditures.

By using the discontinuous version of vinyl chloride emulsion polymerization, polymers are obtained having low emulsifier contents. In order to obtain stable latices and polyvinyl chloride pastes having a low paste viscosity when conducting the polymerization with low emulsifier quantities, it has been suggested to utilize the so-called seed latex method. Therein, a seed latex (nucleating latex or primary dispersion) is provided for the emulsion polymerization. However, this operation is very expensive on a large industrial scale, since the primary dispersion must be separately prepared, stored, and dosed. Furthermore, the attainable stability of the thus-prepared latices is not optimized. The viscosities of the polyvinyl chloride pastes obtained according to this method still lie markedly above the paste viscosities achieved according to the continuous process.

In accordance with the methods described in German Pat. No. 1,964,029 and the laid-open text of Belgian Pat. No. 656,985, the emulsifier is added during the polymerization procedure in accordance with a specific program. It is possible by these methods to prepare polyvinyl chloride having especially low emulsifier contents. However, the polyvinyl chloride pastes obtained according to this process still exhibit a substantially higher viscosity than those obtained by using the continuous procedure (see, in this connection, Comparative Example D herein).

Discontinuous processes are known which are conducted using dispersion aids (fatty alcohols); see, e.g., 1. DOS No. 2,260,957
2. DAS No. 2,629,655
3. DOS No. 2,850,105
4. DOS No. 2,742,178.

The polymerizations of (1), (2), and (3) are effected by means of oil-soluble activators (catalysts), partially with the addition of reducing agents. These processes lead to products which, when processed into plastisols, show a strongly dilatant flow characteristic, as can be seen from Comparative Experiment A herein.

The process described in (4) uses inorganic catalysts for activating purposes. According to (4), a preliminarily agitated mixture consisting of a $C_{16}$–$C_{20}$-alkyl alcohol and an alkyl sulfate ($C_{12}$–$C_{18}$) is employed in the polymerization. As demonstrated by Comparative Experiments B and C herein, either unstable latices or low-solid-content latices are obtained according to the method of (4). After spray-drying, these yield a polyvinyl chloride resulting in highly viscous pastes having a pronounced pseudo-plastic flow behavior.

SUMMARY OF THE INVENTION

Accordingly, it is an object of this invention to provide a process which combines the advantages of the continuous mode of operation with the advantages of the discontinuous method, i.e., a process preparing a polyvinyl chloride having minimum emulsifier contents while simultaneously leading to pastes having low viscosities in the low and high shear ranges.

It is another object of this invention to provide such a process which eliminates of significantly ameliorates the disadvantages of the prior art.

Upon further study of the specification and appended claims, further objects and advantages of this invention will become apparent to those skilled in the art.

These objects have been achieved by providing a process for the production of paste-forming polymers of vinyl chloride or mixtures of vinyl chloride with up to 30% by weight of copolymerizable monomers by discontinuous polymerization in the presence of water-soluble catalysts and an emulsifier system of emulsifiers and long-chain alcohols, wherein there is added to the polymerization charge, batchwise or continuously, an emulsifier system comprising:

(a) alkyl sulfonates of 10–20 carbon atoms in the alkyl residue, alkylaryl sulfonates of 8–18 carbon atoms in the alkyl residue, or sulfosuccinates of 6–14 carbon atoms in the alcohol portion, in amounts of 0.2–3% by weight, based on the total amount of all monomers, and (b) 50–200% by weight, based on the amount of surface active agent (tenside) employed, of a $C_{14}$–$C_{20}$-alkyl alcohol.

DETAILED DISCUSSION

The process of this invention makes it possible to manufacture latices having a solids content of up to 50% by weight without appreciable formation of undesired coagulate. The paste viscosity of the PVC obtained according to the process of this invention is low and exhibits an almost Newtonian flow characteristic.

The polymers obtained according to the process of this invention are especially suitable for the production of plastisols with a very low viscosity. The flow properties of these plastisols are distinguished by a low viscosity, not only in the low shear range but also in the high shear range. This effect is especially desirable when processing the plastisols in accordance with the conventional spread-coating process. A low paste viscosity in the lower shear range facilitates handling of the pastes, for example, conveyance and/or screening thereof, as well as inproving the self-de-aerating property during processing. A low paste viscosity in the high shear range makes it possible to attain a high processing speed.

Furthermore, the polymers produced according to this invention can be utilized advantageously for the conventional manufacture of soft foam materials using chemical blowing agents. The resultant products yield foam materials having good to very good foam properties even with only a brief residence time in a gelling duct.

The emulsifier system of this invention comprises:

(a) alkali metal or ammonium salts of alkyl sulfonic acids or alkylaryl sulfonic acids or sulfosuccinic acid esters in amounts of 0.2–3% by weight, preferably 0.5–1.5% by weight, based on the total amount of all monomers, and (b) a straight-chain or branched $C_{14}$–$C_{20}$-alkyl alcohol (alkanol) or a mixture of several (two or more) such alcohols in amounts of 50–200% by weight, preferably 70–150% by weight, based on the amount of tenside employed, i.e., based on the amount of component (a) employed.

Suitable alkali metal or ammonium salts of alkylsulfonic acids used as the emulsifier component (a) include those wherein the alkyl residues contain 10–20 carbon atoms, preferably 14–17 carbon atoms and are branched or unbranched. Examples include: sodium decyl sulfonate, sodium dodecyl sulfonate, sodium myristyl sulfonate, sodium palmityl sulfonate, sodium stearyl sulfonate, sodium heptadecyl sulfonate, or sodium arachyl sulfonate. Also the potassium or ammonium salts can be utilized with analogous success. In general, however, mixtures of the abovementioned individual compounds will be preferred as they are obtained in the sulfonation of industrial alkane mixtures and thus are readily commercially available.

Alkali metal and ammonium salts of alkylaryl, e.g., alkylbenzene sulfonic acids which can be utilized as the emulsifier component include those wherein the alkyl chain has 8–18 carbon atoms, preferably 10–13 carbon atoms and is branched or unbranched. Examples include: sodium tetrapropylene benzenesulfonate, sodium p-m-dodecyl benzenesulfonate, sodium octadecyl benzenesulfonate, sodium octyl benzenesulfonate, sodium decyl benzenesulfonate, sodium tridecyl benzenesulfonate, sodium tetradecyl benzenesulfonate, sodium pentadecyl benzenesulfonate, or sodium hexadecyl benzenesulfonate. Preferably, mixtures of such individual compounds are employed. The potassium or ammonium salts can likewise be used.

Suitable alkali metal and ammonium salts of sulfosuccinic acid esters usable as emulsifier components are those wherein the esterifying alcohol portion contains 6–14 carbon atoms, preferably 8–10 carbon atoms and is branched or unbranched. Examples include: sodium dihexyl sulfosuccinate, sodium dioctyl sulfosuccinate, sodium di-2-ethyl-hexyl sulfosuccinate, sodium didecyl sulfosuccinate, sodium didodecyl sulfosuccinate, sodium diisodecyl sulfosuccinate, sodium diisododecyl sulfosuccinate, sodium ditridecyl sulfosuccinate, or sodium ditetradecyl sulfosuccinate, and the corresponding potassium and ammonium salts. It is also possible to use mixtures of the aforementioned emulsifiers. These emulsifiers generally have the formula

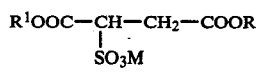

$$R^1OOC\text{—}CH\text{—}CH_2\text{—}COOR$$
$$|$$
$$SO_3M$$

wherein R and $R^1$ are each $C_{6-14}$-alkyl; M is ammonium or an alkali metal.

Mixtures of the three general classes of emulsifiers can also be used.

Suitable dispersion aids include straight-chain or branched $C_{14}$–$C_{20}$-alcohols (e.g., alkanols), such as, for example, myristyl alcohol, palmityl alcohol, stearyl alcohol, arachyl alcohol, 2-hexadecanol, or 2-octyldodecanol. Mixtures of such alcohols can likewise be employed.

Components (a) and (b) of the emulsifier system can be suitably dissolved or dispersed in water outside of the reactor. Since the melting points of the fatty alcohols lie above room temperature, the solution and dispersing step is advantageously conducted at temperatures of 30°–80° C., i.e., above the melting temperature of the fatty alcohols. The solution and dispersing step can be carried out in customary stirrer-equipped vessels. No special requirements need to be met regarding agitation intensity and duration of agitation.

A polyvinyl chloride latex having solids contents of up to 50% by weight is obtained according to the process of this invention, irrespective of whether the emulsifier mixture is added continuously or batchwise during the polymerization period. Up to a conversion of 50%, no more than half the total amount of emulsifier to be added for this invention is to be added batchwise or continuously. The addition of emulsifier can take place, for example, according to the laid-open disclosure of Belgian Pat. No. 656,985 whose disclosure is incorporated by reference herein. With respect to the paste viscosity of the final product, it is especially advantageous to add the emulsifier in such a way that during the polymerization, the surface tension of the polymer dispersion is maintained within narrow limits, e.g. during the polymerization process the surface tension of the dispersion should be maintained at a value that is about 15 to 30% higher than the value of the surface tension belonging to a 2 weight % aqueous solution of the emulsifier used, in accordance with Federal Republic of Germany Patent Application No. P 30 49 008. 5, whose disclosure is incorporated by reference herein. A very suitable way of adding the emulsifier is also that described in German Pat. No. 1,964,029, whose disclosure is incorporated by reference herein. According to the process of this invention, the monomer can be added all at once, or it can be added continuously or batchwise. Of course, a quantity of vinyl chloride must always be present such that the necessary conversion is ensured. Unless indicated otherwise herein, all the details of the process of this invention are fully conventional, e.g., as disclosed in Ullmanns Encyclopädie der technischen Chemie, Vol. 19, Verlag Chemie, Weinheim, Deerfield Beach (Fla.), Basel, page 346, whose disclosure is incorporated by reference herein.

Suitable comonomers, for example, include vinyl acetate, vinylidene chloride, vinyl ether, acrylonitrile, or acrylic acid esters, etc. The comonomer can be present in the copolymer in an amount of up to 30% by weight, preferably of 1 to 20% by weight.

The water can likewise be initially provided all at once or can be added continuously. In general, it is advantageous to provide at least 25% by weight of the water initially and add the other portion together with the emulsifier system and/or with the activator.

The ratio of monomers to water is conventionally arbitrary, up to very high vinyl chloride concentrations (about 1:0.6 to 1:1.6). In general, it will be desirable to conduct the polymerization so that latices are obtained having a maximally high solids content. The final conversion, of course, is to be as high as possible.

Suitable catalysts include the usual water-soluble per-compounds, such as $H_2O_2$, potassium persulfate, as well as the redox systems as described, for example, in Kainer, "Polyvinylchlorid und Vinylchlorid-Mischpolymerisate" [Polyvinyl Chloride and Vinyl Chloride Copolymers], Springer Publishers, 1965, pp. 46 et seq., whose disclosure is incorporated by reference herein.

The polymerization temperature is usually 40°–70° C., depending on the molecular weight desired. The polymerization period is dependent, as conventional, on the polymerization temperature and on the catalyst concentration and can be about 4 to 16 hours. Suitably, the agitation is carried out at customary peripheral velocities and using the flat-blade mixers usually employed in emulsion polymerization processes.

Details of the use of the polymers produced by this invention are also fully conventional, especially their use in forming pastes and in spread coating; see, e.g., Kunststoff-Handbuch, Polyvinylchlorid, Vol. II, part 1, Carl Hanser Verlag, München, (1963), page 409–438, whose disclosure is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A 50-liter container is charged with 17 kg of water at a temperature of 60° C. Under agitation, 8.6 kg of a 21% aqueous sodium alkyl benzenesulfonate solution (mixture of $C_{10}$–$C_{13}$-alkyl benzenesulfonates) as well as 1.8 kg of a mixture of approximately equal parts of cetyl alcohol and stearyl alcohol are added thereto.

An agitator-equipped autoclave, capacity 500 l, which is provided with heating and cooling devices, is charged with 120 l of demineralized water, 0.2 l of the previously prepared emulsifier solution, 260 g of monosodium phosphate under the exclusion of atmospheric oxygen. The mixture is heated to 52° C. To this mixture is added 45 kg of vinyl chloride, and the reaction is started up by adding metered amounts of a 0.5% aqueous $H_2O_2$ solution and a 0.2% aqueous ascorbic acid solution in respectively equal parts.

The metered feeding of the activator is adjusted so that, with almost full cooling capacity, the polymerization temperature of 52° C. remains constant. During the further course of the polymerization, another 135 kg of vinyl chloride is added in metered amounts within 3 hours. The remaining emulsifier solution is distributed during the reaction period as follows:

|  | Time (h) | | | |
| --- | --- | --- | --- | --- |
|  | 1 | 2 | 3 | 4 |
| Emulsifier (1) | 0.5 | 5.8 | 10.3 | 10.7 |

The emulsifier content is 1% (based on vinyl chloride employed); the solids content is 48%, the K value is 70 (K value method by Fikentscher: Lunge-Berl, 1934/5, page 945).

The dispersion is worked up in a spray-drying installation. The inlet temperature of the drying air is 160° C., the outlet temperature is 60° C. Otherwise, the processing takes place as described in DAS No. 2,146,753.

A paste is prepared from 100 parts by weight of the thus-obtained PVC powder and 60 parts by weight of di-2-ethylhexyl phthalate (DOP), and the viscosity of this paste is measured after 2 hours of storage at various shear rates in a rotary viscometer (apparatus: Rheomat 30 of Contraves Ag, Zuerich). Table 1 lists the paste viscosities at various shear rates.

In order to test the foaming properties of the polyvinyl chloride foam, a paste is produced according to the following formulation:

100 parts of polyvinyl chloride
37 parts of di-2-ethylhexyl phthalate
20 parts of benzyl butyl phthalate
3 parts of azodicarbonamide
1.5 parts of Cd/Zn stabilizer The paste is de-aerated for 1 hour under vacuum. After a storage period of another 24 hours, the paste is spread-coated onto a release paper with an application thickness of 1 mm and, with variation of the residence time, is gelled and expanded at 220° C. in a gelling duct.

An evaluation is made of the density, the pore structure, and the surface quality of the PVC foam. Table 2 shows the test results.

EXAMPLE 2

The procedure of Example 1 is repeated, but using as the emulsifier a mixture of 4.3 kg of an aqueous sodium alkyl benzenesulfonate solution (mixture of $C_{10}$–$C_{13}$-alkyl benzenesulfonates) (21% by weight) and 1.3 kg of an aqueous sodium salt solution of the di-2-ethylhexyl ester of sulfosuccinic acid (70% by weight).

The emulsifier content is 1% (based on vinyl chloride), the solids content is 48.5%, and the K value is 70.4.

The dispersion is worked up as in Example 1. Table 1 discloses the paste viscosities of the powder, made into a paste in a ratio of 100:60. The foaming properties are tested as in Example 1 and are listed in Table 2.

EXAMPLE 3

The process is carried out as described in Example 1, but using as the emulsifier 3 kg of a $C_{12}$–$C_{18}$-mixture of sodium alkyl sulfonates (60% by weight aqueous solution).

The emulsifier content is 1% (based on vinyl chloride), the solids content is 49%, the K value is 70.7.

The dispersion is worked up as in Example 1. The paste viscosities of the powder, made into a paste in a ratio of 100:60, can be derived from Table 1. The foaming properties are tested as in Example 1 and are set forth in Table 2.

COMPARATIVE EXPERIMENT A

In a stirrer autoclave, as described in Example 1, 162 l of water, 8.6 kg of a 21% aqueous sodium alkyl-($C_{10}$–$C_{13}$)-benzenesulfonate solution, 1.8 kg of stearyl alcohol, 0.27 kg of tert-butyl perbenzoate, and 0.54 kg of copper sulfate are heated to 65° C. and agitated for 30 minutes at 120 rpm. This dispersion is combined with 180 kg of vinyl chloride. The agitator speed is then reduced to 10 rpm, and the reaction mixture is cooled to 55° C. By adding metered amounts of an aqueous ascorbic acid solution, the reaction is started up and controlled.

After the reaction has been completed, the solids content of the dispersion is 49.5% and the K value is 69.0. The emulsifier content is 1% (based on vinyl chloride). The dispersion is worked up as in Example 1. The paste viscosities of the powder, made into a paste in a ratio of 100:60, can be seen from Table 1.

COMPARATIVE EXPERIMENT B

In a stirrer autoclave as described in Example 1, a premix is first of all homogenized under agitation at 65° C. for 30 minutes; this premix consists of 170 l of water, 6 kg (30% by weight aqueous solution) of sodium lauryl sulfate, 1.8 kg of stearyl alcohol, and 260 g of monosodium phosphate. The mixture is cooled to 30° C. Thereafter, 180 kg of vinyl chloride and 400 g of potassium persulfate are added thereto. The mixture is stirred for another 15 minutes and the temperature is raised to 54° C.

The polymerization batch coagulates and thus cannot be conveyed by pumping or worked up by means of spray-drying.

COMPARATIVE EXPERIMENT C

The procedure of Comparative Experiment B is applied, except that the ingredients employed are 248 l of water, 4.5 kg (30% by weight aqueous solution) of sodium lauryl sulfate, and 4 kg of stearyl alcohol.

The emulsifier content is 0.75% (based on vinyl chloride), the solids content is 28%, and the K value is 70.1.

The dispersion is worked up as in Example 1.

The paste viscosities of the powder, made into a paste in a ratio of 100:60, can be derived from Table 1.

COMPARATIVE EXPERIMENT D

The process is conducted as described in Example 1, but no fatty alcohol is added to the emulsifier batch.

The emulsifier content is 1% (based on vinyl chloride), the solids content is 50.1%, and the K value is 69.3.

The dispersion is worked up as set forth in Example 1. The paste viscosities of the powder, made into a paste in a ratio of 100:60, can be seen from Table 1.

TABLE 1

| | Paste Viscosity (PVC/DOP Ratio 100:60) in dPa s at Shear Rate D in $s^{-1}$ | | | | |
|---|---|---|---|---|---|
| | D = 0.3 | D = 1 | D = 10 | D = 100 | D = 300 |
| Example | | | | | |
| 1 | 56 | 48 | 42 | 40 | 40 |
| 2 | 72 | 55 | 44 | 41 | 38 |

TABLE 1-continued

| | Paste Viscosity (PVC/DOP Ratio 100:60) in dPa s at Shear Rate D in $s^{-1}$ | | | | |
|---|---|---|---|---|---|
| | D = 0.3 | D = 1 | D = 10 | D = 100 | D = 300 |
| 3 | 68 | 50 | 45 | 42 | 44 |
| Comparative Experiment | | | | | |
| A | 85 | 52 | 36 | 45 | 72 |
| B | — | — | — | — | — |
| C | 480 | 240 | 77 | 46 | 48 |
| D | 650 | 330 | 110 | 65 | 65 |

TABLE 2

| | Foaming Properties | | | | |
|---|---|---|---|---|---|
| | Density [g/cm³] after Residence Time [min] | | | Evaluation of Pore Structure | Evaluation of Foam Surface |
| Example | 1.5 | 2 | 2.5 | (*) | (*) |
| 1 | 0.22 | 0.19 | 0.18 | Fine-Pored | Smooth |
| 2 | 0.23 | 0.19 | 0.18 | Fine-Pored | Smooth |
| 3 | 0.22 | 0.20 | 0.20 | Fine-Pored | Smooth |

(*) Determined after a residence time of 2 minutes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing a paste-forming polymer of vinyl chloride and 0–30 wt. % of a copolymerizable monomer comprising discontinuously polymerizing the monomers in the presence of a water-soluble catalyst and an emulsifier system, the improvement comprising,
    adding to the polymerization charge during the polymerization period, batchwise or continuously, an emulsifier system comprising:
    (a) 0.2–3% by weight based on the total weight of the monomers, of an alkali metal or ammonium salt of an alkyl sulfonic acid of 10–20 carbon atoms in the alkyl group, of an alkylbenzene sulfonic acid of 8–18 carbon atoms in the alkyl group, or of a sulfonated succinic acid diesterified by a $C_{6-14}$-alkanol; and
    (b) 50–200% by weight, based on the amount of component (a) of a $C_{14}$–$C_{20}$-alkanol,
    whereby at a conversion of 50%, at most half of the emulsifier system is added.

2. A process of claim 1 wherein emulsifier component (a) is an alkali metal or ammonium salt of a $C_{14-17}$-alkylsulfonic acid.

3. A process of claim 1 wherein emulsifier component (a) is sodium decyl sulfonate, sodium dodecyl sulfonate, sodium myristyl sulfonate, sodium palmityl sulfonate, sodium stearyl sulfonate, sodium heptadecyl sulfonate, or sodium arachyl sulfonate.

4. A process of claim 1 wherein emulsifier component (a) is an alkali metal or ammonium salt of a ($C_{10-13}$-alkyl)benzenesulfonic acid.

5. A process of claim 1 wherein emulsifier component (a) is sodium tetrapropylene benzenesulfonate, sodium p-n-dodecyl benzenesulfonate, sodium octadecyl benzenesulfonate, sodium octyl benzenesulfonate, sodium decyl benzenesulfonate, sodium tridecyl benzenesulfonate, sodium tetradecyl benzenesulfonate, sodium pentadecyl benzenesulfonate, or sodium hexadecyl benzenesulfonate.

6. A process of claim 1 wherein emulsifier component (a) is an alkali metal or ammonium salt of the sulfonate group of a sulfonated succinic acid alkyl ester wherein each alkyl ester group is of 8–10 C-atoms.

7. A process of claim 1 wherein emulsifier component (a) is sodium dihexyl sulfosuccinate, sodium dioctyl sulfosuccinate, sodium di-2-ethyl-hexyl sulfosuccinate, sodium didecyl sulfosuccinate, sodium didodecyl sulfosuccinate, sodium diisodecyl sulfosuccinate, sodium diisododecyl sulfosuccinate, sodium ditridecyl sulfosuccinate, or sodium ditetradecyl sulfosuccinate.

8. A process of claim 1 wherein emulsifier component (a) is a mixture of said sulfonates.

9. A process of claim 1 wherein emulsifier component (b) is myristyl alcohol, palmityl alcohol, stearyl alcohol, arachyl alcohol, 2-hexadecanol, or 2-octyldodecanol.

10. A process of claim 1 wherein the amount of emulsifier component (a) is 0.5–1.5% by weight and the amount of emulsifier component (b) is 70–150% by weight, both on the same basis as in claim 1.

11. A process of claim 1, wherein emulsifier component (a) is a sodium salt.

12. A process of claim 1, wherein the surface tension of the polymer dispersion during polymerization is maintained at a value that is 15 to 30% higher than the value of the surface tension belonging to a 2 weight % aqueous solution of the emulsifier used.

13. A process of claim 1, wherein 1–20 wt. % of a comonomer is employed and is vinyl acetate, vinylidene chloride, vinyl ether, acrylonitrile, or an acrylic acid ester.

14. A process of claim 1, wherein the weight ratio of monomers to water is 1:0.6 to 1:1.6.

15. A process of claim 1, wherein the polymerization temperature is 40°–70° C.

16. A process for producing a paste-forming polymer of vinyl chloride and 0 to 30% by weight of a copolymerizable monomer, the resultant polymer having low viscosity at low shear rates, comprising discontinuously polymerizing the monomer in the presence of a water soluble catalyst and an emulsifier system, and adding to the polymerization charge during the polymerization period, batchwise or continuously, an emulsifier system comprising:
(a) 0.2–3% by weight, based on the total weight of the monomers, of an alkali metal or ammonium salt of an alkyl sulfonic acid of 10–20 carbon atoms in the alkyl group, of an alkylbenzene sulfonic acid of 8–18 carbon atoms in the alkyl group, or of a sulfonated succinic acid diesterified by a $C_{6-14}$-alkanol; and
(b) 50–200% by weight, based on the amount of component (a) of a $C_{14}$–$C_{20}$-alkanol, whereby at a conversion of 50%, at most half of the emulsifier system is added.

17. A process of claim 1 wherein component (a) is of the formula

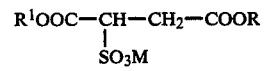

wherein R and $R^1$ are each $C_{6-14}$-alkyl; and M is ammonium or an alkali metal.

* * * * *